United States Patent
Kang

(10) Patent No.: US 8,009,425 B2
(45) Date of Patent: Aug. 30, 2011

(54) RETAINING APPARATUS FOR DATA STORAGE DEVICE

(75) Inventor: Sheng Kang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipie (TW)

( * ) Notice: Subject to any disclaimer, the term of this patent is extended or adjusted under 35 U.S.C. 154(b) by 157 days.

(21) Appl. No.: 12/534,222

(22) Filed: Aug. 3, 2009

(65) Prior Publication Data

US 2010/0284145 A1  Nov. 11, 2010

(30) Foreign Application Priority Data

May 8, 2009  (CN) ...................... 2009 2 0302973 U

(51) Int. Cl.
   *G06F 1/16* (2006.01)
(52) U.S. Cl. ................................. 361/679.58; 248/27.3
(58) Field of Classification Search ............. 361/679.33, 361/679.37, 679.39, 679.34, 679.35, 679.36
   See application file for complete search history.

(56) References Cited

U.S. PATENT DOCUMENTS

| | | | | |
|---|---|---|---|---|
| 6,058,016 A * | 5/2000 | Anderson et al. | ............. | 361/727 |
| 6,067,225 A * | 5/2000 | Reznikov et al. | ........ | 361/679.31 |
| 6,325,353 B1 * | 12/2001 | Jiang | ............................. | 248/682 |
| 6,356,441 B1 * | 3/2002 | Claprood | ................. | 361/679.33 |
| 6,359,778 B1 * | 3/2002 | Wu | ......................... | 361/679.33 |
| 6,421,236 B1 * | 7/2002 | Montoya et al. | ......... | 361/679.58 |
| 6,442,021 B1 * | 8/2002 | Bolognia et al. | ......... | 361/679.34 |
| 6,490,153 B1 * | 12/2002 | Casebolt et al. | ......... | 361/679.33 |
| 7,092,250 B2 * | 8/2006 | Chen et al. | ............... | 361/679.35 |
| 7,303,170 B2 * | 12/2007 | Fan et al. | ..................... | 248/27.3 |
| 7,443,668 B2 * | 10/2008 | Hsu | ........................ | 361/679.33 |
| 7,477,511 B2 * | 1/2009 | Hsu et al. | ................. | 361/679.37 |
| 7,511,953 B2 * | 3/2009 | Tao et al. | ................. | 361/679.39 |
| 7,548,417 B2 * | 6/2009 | Lai | ........................... | 361/679.36 |
| 2002/0101708 A1 * | 8/2002 | Cheng | ........................... | 361/685 |
| 2004/0150948 A1 * | 8/2004 | Tang | .............................. | 361/685 |

* cited by examiner

*Primary Examiner* — Lisa Lea Edmonds
(74) *Attorney, Agent, or Firm* — Altis Law Group, Inc.

(57) ABSTRACT

A retaining apparatus for at least one data storage device includes a tray and a retaining device. The tray is used for receiving the at least one data storage device, and the retaining device is attached to the tray. The retaining device includes an elongated base member, an elongated arm member and a blocking member. The base member is attached to the front side of the tray. The arm member is pivotably attached to the base member about a pivot axis. The arm member has a retaining portion at the first distal end for retaining the retaining device at a retaining position. The blocking member is attached to the base member and slidable along a first direction that is substantially perpendicular to the pivot axis. The blocking member is capable of securing the arm member at a second distal end of the arm member opposite to the first distal end.

20 Claims, 6 Drawing Sheets

RETAINING APPARATUS FOR DATA STORAGE DEVICE

BACKGROUND

1. Technical Field

The disclosure generally relates to a retaining apparatus for data storage devices, especially to a retaining apparatus with a tray for receiving and retaining at least one data storage device.

2. Description of Related Art

Usually, a data storage device, such as a hard disk drive is simply screwed to a computer enclosure. This conventional mounting means can be complex, difficult and substantially wastes time. In addition, in use, vibration of the data storage device may cause the screws to come loose and may result in damage to the data storage device. Understandably, some attempts have been taken to introduce a mounting apparatus for a data storage device without screws.

DETAILED DESCRIPTION

Figure 5:
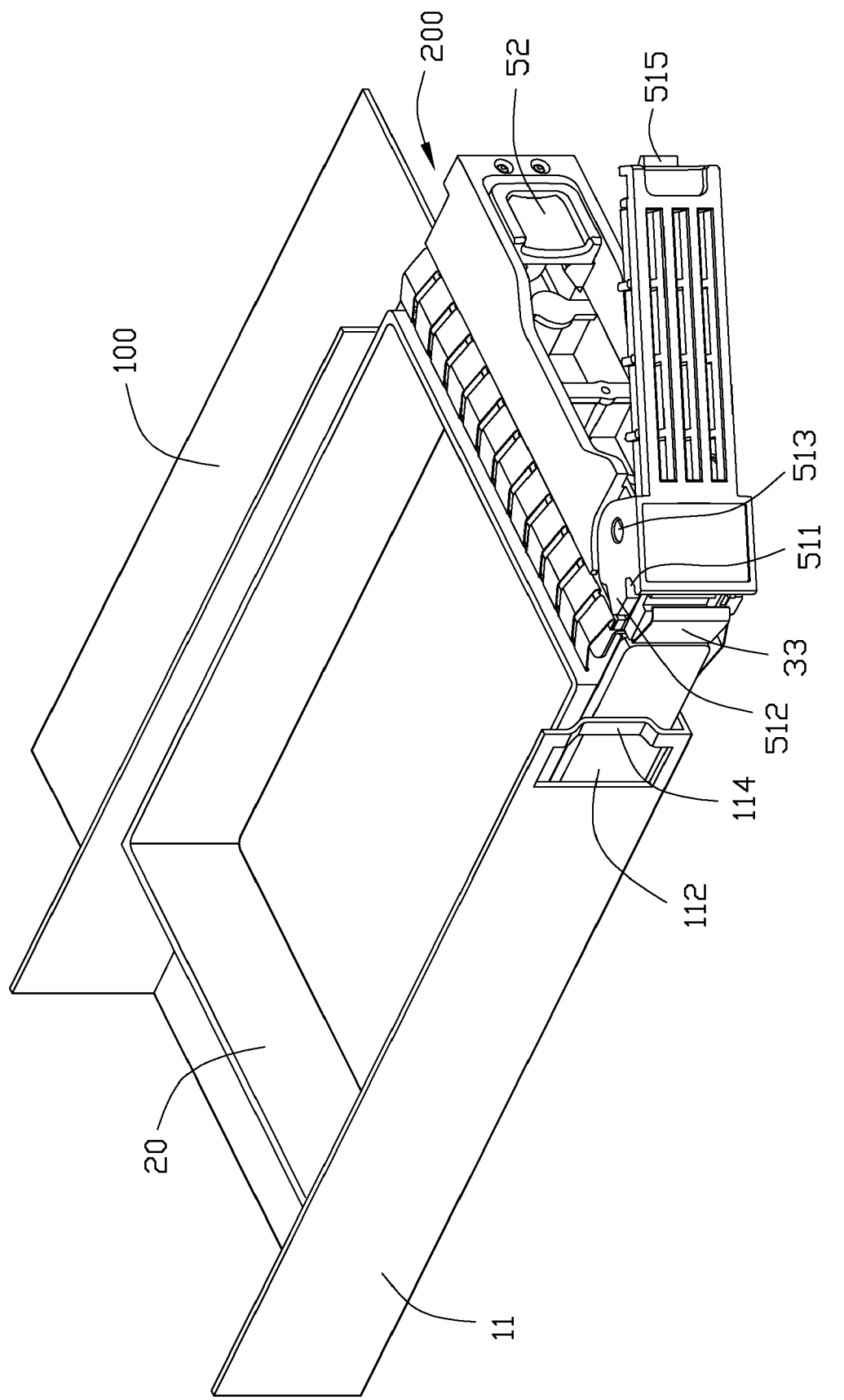
FIG. 5 is a pre-assembled view of the retaining apparatus and a bracket.

Referring to FIG. 5, a bracket 100 is used in a computer or an electronic device for mounting at least one retaining apparatus 200 for data storage device. The bracket 100 includes two parallel side plates 11. A slideway is defined between the two side plates 11 for receiving the retaining apparatus 200. Each side plate 11 defines an opening 112 and has a vertical baffle 114. The baffle 114 is slightly recessed into the slideway.

Figure 1:
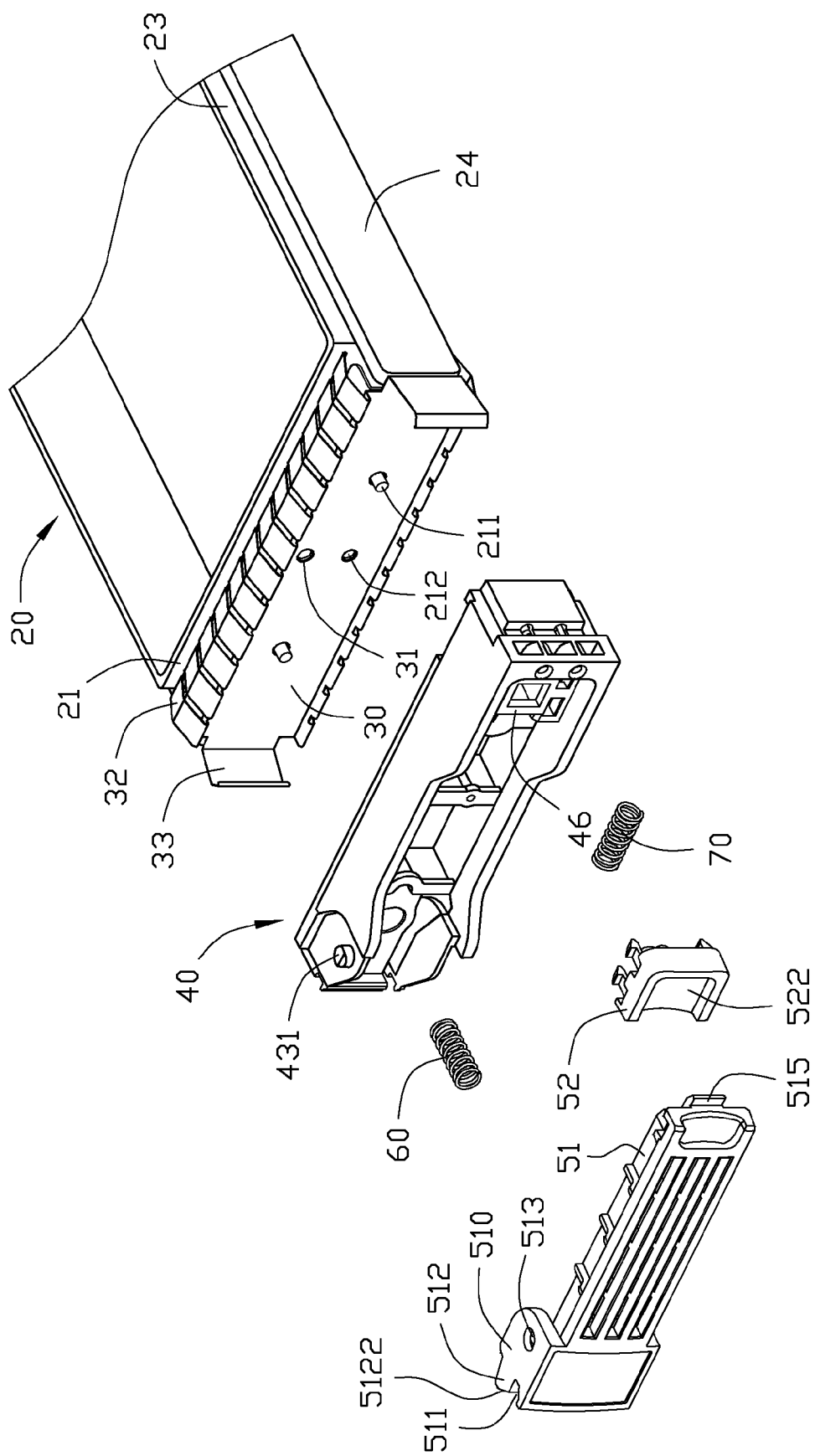
FIG. 1 is an exploded, isometric view of a retaining apparatus.
Figure 2:
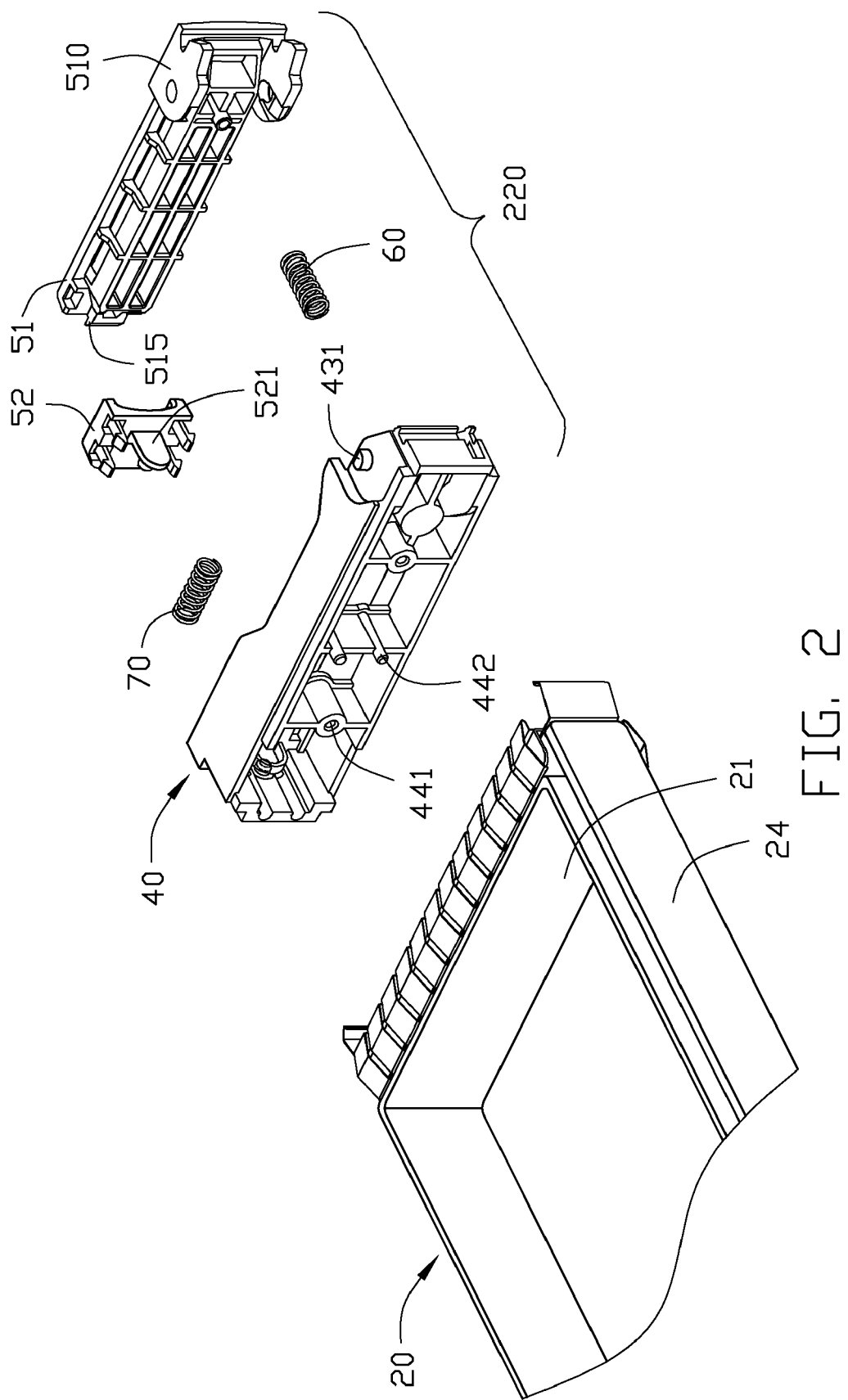
FIG. 2 is similar to FIG. 1, but showing in another aspect.

Referring to FIG. 1 and FIG. 2, each retaining apparatus 200 includes a tray 20 and a retaining device 220. The tray 20 has a front wall 21 and two parallel side walls 23. At least one screw post 211 protrudes from front wall 21. At least one positioning hole 212 is defined in the front wall 21 of the tray 20. An elastic cushion 24 is attached to each side wall 23 for absorbing lateral shock to the tray 20.

A shielding clip 30 is attached to the front wall 21 of the tray 20. The shielding clip 30 is made from flake metal for providing electromagnetic interference (EMI) shielding. The shielding clip 30 has a plurality of V-shaped resilient touch fingers 32 on top and bottom sides of the shielding clip 30 and a pair of L-shaped resilient touch fingers 33 on lateral sides thereof. At least one through hole 31 is defined in the shielding clip 30 corresponding to the at least one positioning hole 212.

The retaining device 220 includes a base member 40, an arm member 51 and a blocking member 52. The base member 40 has a pair of pivot pins 431 at one end of the base member 40 and a restricting portion 46 at an opposite end thereof. A pivot axis is defined through the two pivot pins 431. At least one screw hole 441 is defined corresponding to the at least one screw post 211. At least one positioning post 442 protrudes from the base member 40 corresponding to the at least one positioning hole 212.

The arm member 51 defines a pair of pivot holes 513 in a first end thereof corresponding to the pivot pins 431 and has a retaining portion 510 formed at a distal portion of the first end. The retaining portion 510 defines a cutout 511 to engage with the baffle 114 and has a wedge-shaped ridge 512. The ridge 512 has an angled engaging surface 5122. A wedge-shaped protrusion 515 extends from a second end of the arm member 51. The second end opposites to the first end. A coil spring 60 is located between the base member 40 and the arm member 51, and provides ejection force to the arm member 51 to rotate the arm member 51 away from the base member 40.

The blocking member 52 is movably attached to the base member 40 along a first direction that is perpendicular to the pivot axis. The blocking member 52 is mounted to the restricting portion 46 of the base member 40. The blocking member 52 is capable of blocking the protrusion 515 of the arm member 50 from rotating away from the base member 40. A recess 522 is defined in the blocking member 52 for facilitating operation of the blocking member 52. The blocking member 52 has a tab 521 extending towards the base member 40. A coil spring 70 is located between the base member 40 and the tab 521 to bias the blocking member 52 along the first direction in a blocking position.

Figure 3:
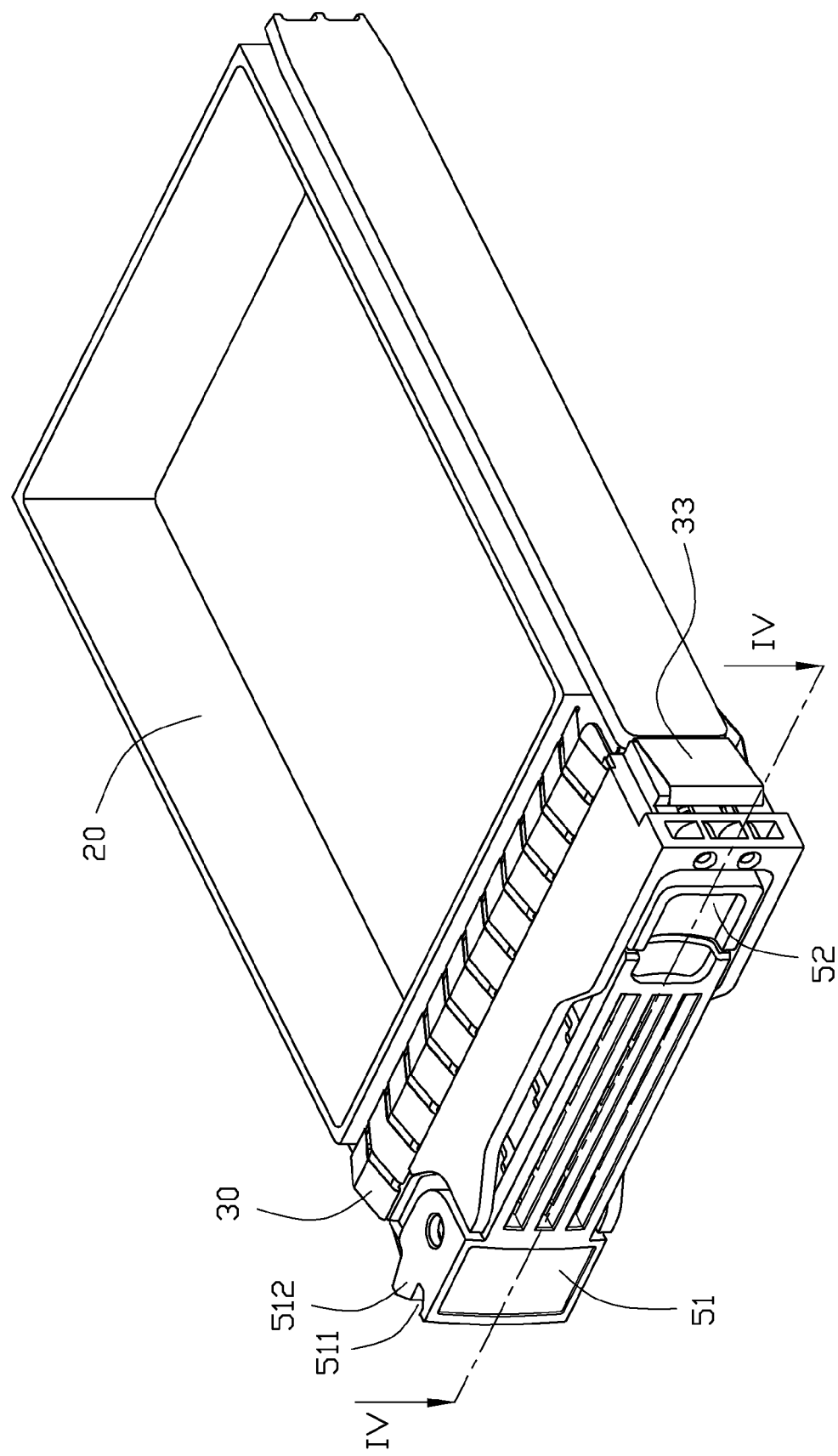
FIG. 3 is an assembled view of FIG. 1.
Figure 4:
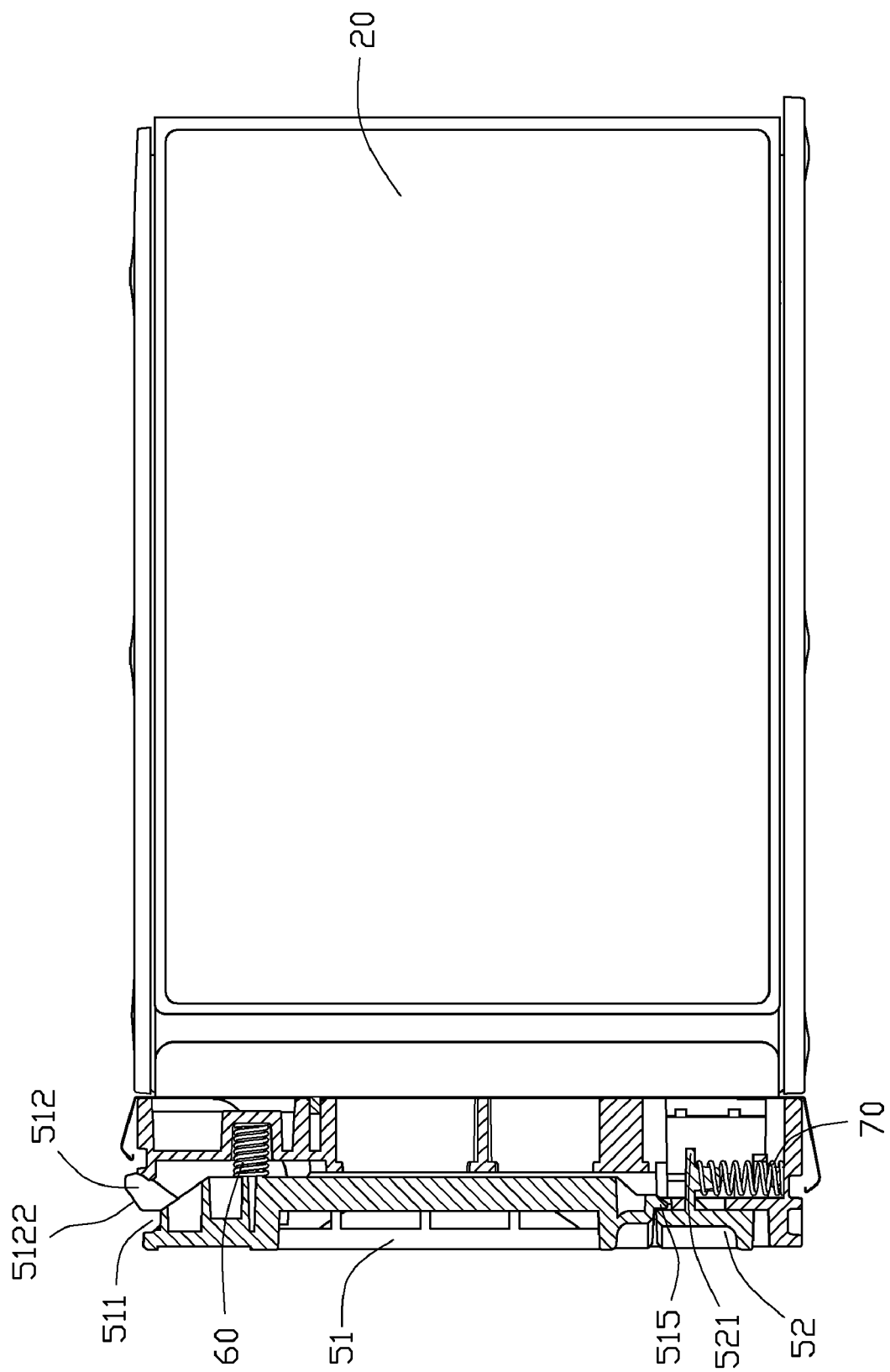
FIG. 4 is a section view of the FIG. 3.

Referring to FIG. 3 and FIG. 4, when assembling the retaining apparatus 200, the base member 40 is first mounted to the front wall 21 of the tray 20 with the shielding clip 30 sandwiched between the tray 20 and base member 40. The arm member 51 is rotatably fixed to the base member 40 about the pivot axis and the spring 60 is located between the base member 40 and the arm member 51. The blocking member 52 is movably mounted to the base member 40, and the spring 70 is located between the base member 40 and blocking member 52.

Figure 6:
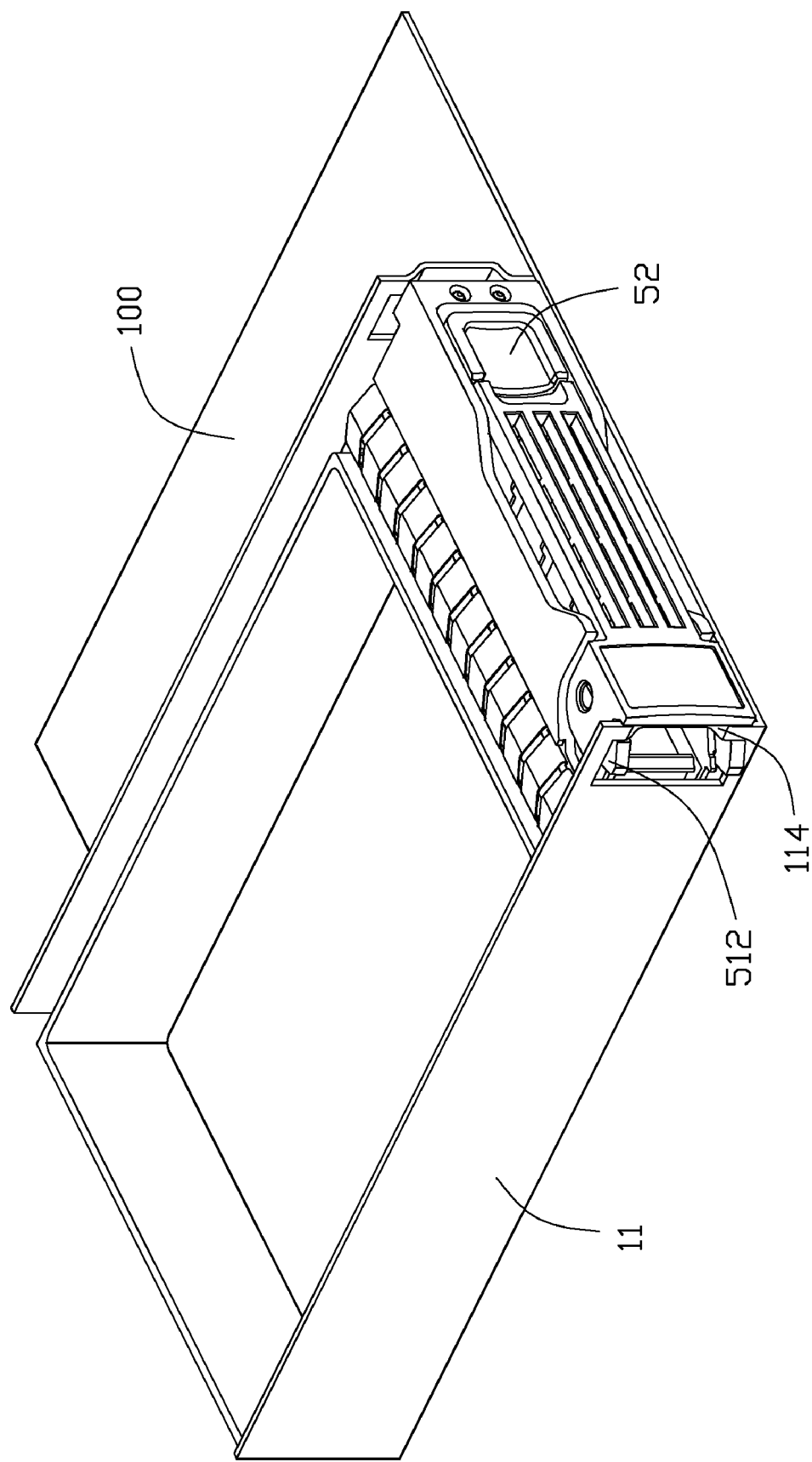
FIG. 6 is similar to FIG. 5, but showing the retaining apparatus mounted in the bracket.

Referring to FIG. 5 and FIG. 6, when mounting the retaining apparatus 200 into the bracket 100, the arm member 51 is angled from the base member 40 and the engaging surface 5122 is positioned parallel to the side plate 11 of the bracket 100. The tray 20 and the retaining device 220 are completely slid into the slideway of the bracket 100. Each resilient touch finger 33 is sandwiched between each side plate 11 and a lateral side of the base member 40. Then the arm member 51 is rotated to the base member 40, the baffle 114 is engaged into the cutout 511 gradually. When the second end of the arm member 51 reaches the base member 40, the wedge-shaped protrusion 515 urges the blocking member 52 to move sideways. The blocking member 52 returns to an original position and blocks the arm member 51 from rotating outwardly when the arm member 51 is completely moves into the arm member 40. The spring 60 is pressed. The retaining apparatus 200 is then mounted to the bracket 100.

When removing the retaining apparatus 200 from the bracket 100, the blocking member 52 is laterally moved. The arm member 52 rotates outwardly due to the resilient force of the spring 60. The retaining portion 510 is disengaged from the baffle 114. The retaining apparatus 200 then is capable of being moved out of the bracket 100.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining apparatus for at least one data storage device, comprising:
   a tray for receiving the at least one data storage device; and
   a retaining device attached to a front side of the tray, the retaining device comprising:
   an elongated base member attached to the front side of the tray;
   an elongated arm member, separated from the tray, pivotably attached to the base member about a pivot axis, the arm member having a retaining portion at the first distal end for retaining the retaining device at a retaining position; and
   a blocking member attached to the base member and slidable along a first direction that is substantially perpendicular to the pivot axis, the blocking member being capable of securing the arm member at a second distal end of the arm member opposite to the first distal end;
   wherein when the arm member is blocked by the blocking member, the arm member is positioned at the retaining position, and the tray and the retaining device are secured; and when the arm member is released by the blocking member, the retaining portion is capable of being disengaged from the tray by rotating the arm member away from the base member.

2. The retaining apparatus of the claim 1, wherein the tray comprises two side walls extending substantially perpendicular to an extension of the base member; an elastic cushion is attached to each side wall for shock absorption.

3. The retaining apparatus of the claim 1, wherein a shielding clip is sandwiched between the tray and the base member is capable of providing electro-magnetic interference shielding.

4. The retaining apparatus of the claim 3, wherein the shielding clip comprising a pair of resilient touch fingers connected opposite sides of the shielding chip, and each touch finger is substantially perpendicular to the shielding chip and extends to a lateral side of the base member.

5. The retaining apparatus of the claim 1, wherein the blocking member has a tab extending towards the base member; a spring is located between the base member and the tab to bias the blocking member in a blocking position.

6. The retaining apparatus of the claim 1, wherein a wedge-shaped protrusion extends from the second end of the arm member capable of engaging the blocking member.

7. The retaining apparatus of the claim 1, wherein a recess is defined in the blocking member.

8. The retaining apparatus of the claim 1, wherein a coil spring is located between the base member and the arm member, so that when the arm member is disengaged from the blocking member, the arm member is capable of ejecting from the base member.

9. The retaining apparatus of the claim 1, wherein a positioning post protrudes from the base member; and a positioning hole is defined in the tray for receiving the positioning post.

10. A computer comprising:
    a bracket comprising a side plate, the side plate has a baffle at a front end thereof; and
    a retaining apparatus comprising:
    a tray for receiving the data storage device; and
    a retaining device attached to a front side of the tray, the retaining device comprising:
    a base member attached to the front side of the tray;
    an arm member, separated from the tray, pivotably attached to the base member about a pivot axis, the arm member having a retaining portion to engage the baffle; and
    a blocking member attached to the base member and slidable along a first direction that is substantially perpendicular to the pivot axis, the blocking member being capable of securing the retaining portion;
    wherein when the arm member is blocked by the blocking member, the retaining apparatus is retained in the bracket with the retaining portion engaging with the baffle; and when the arm member is rotated away from the base member, the retaining portion is released by the blocking member and disengages the retaining apparatus.

11. The computer of the claim 10, wherein the tray comprises two side walls extending substantially perpendicular to an extension of the base member; an elastic cushion is attached to each side wall for shock absorption.

12. The computer of the claim 10, wherein an electro-magnetic shielding clip is located between the tray and the base member.

13. The computer of the claim 12, wherein the electro-magnetic shielding clip comprising a pair of resilient touch fingers connected opposite sides of the electro-magnetic shielding chip, and each resilient touch finger is substantially perpendicular to the electro-magnetic shielding chip and is located between a lateral side of the base member and the side plate.

14. The computer of the claim 10, wherein the blocking member has a tab extending towards the base member; a spring is located between the base member and the tab to bias the blocking member in a blocking position.

15. The computer of the claim 10, wherein a protrusion extends from the second end of the arm member capable of engaging the blocking member.

16. The computer of the claim 10, wherein a recess is defined in the blocking member.

17. The computer of the claim 10, wherein a coil spring is located between the base member and the arm member so that when the arm member is disengaged from the blocking member, the arm member is capable of ejecting from the base member.

18. The computer of the claim 10, wherein a positioning post protrudes from the base member; and a positioning hole is defined in the tray for receiving the positioning post.

19. The computer of the claim 10, wherein the baffle is vertically formed on the side plate; the retaining portion has a cutout to receive the baffle.

20. The computer of the claim 10, wherein the retaining portion has a wedge-shaped ridge.

* * * * *